US010618116B2

(12) United States Patent
Woodman

(10) Patent No.: US 10,618,116 B2
(45) Date of Patent: Apr. 14, 2020

(54) LATHE ERROR-CORRECTING COLLET CHUCK

(71) Applicant: Mark Woodman, Fremont, NH (US)

(72) Inventor: Mark Woodman, Fremont, NH (US)

( * ) Notice: Subject to any disclaimer, the term of this patent is extended or adjusted under 35 U.S.C. 154(b) by 0 days.

(21) Appl. No.: 15/966,035

(22) Filed: Apr. 30, 2018

(65) Prior Publication Data

US 2018/0318937 A1 Nov. 8, 2018

Related U.S. Application Data

(60) Provisional application No. 62/501,469, filed on May 4, 2017.

(51) Int. Cl.
| | |
|---|---|
| *B23B 31/02* | (2006.01) |
| *B23B 29/24* | (2006.01) |
| *B23B 31/20* | (2006.01) |
| *B23B 25/06* | (2006.01) |
| *B23B 29/20* | (2006.01) |

(52) U.S. Cl.
CPC ............ *B23B 31/026* (2013.01); *B23B 25/06* (2013.01); *B23B 29/205* (2013.01); *B23B 29/248* (2013.01); *B23B 31/028* (2013.01); *B23B 31/20* (2013.01); *B23B 2231/2078* (2013.01); *B23B 2231/22* (2013.01); *B23B 2231/24* (2013.01); *Y10T 82/2579* (2015.01); *Y10T 279/14* (2015.01)

(58) Field of Classification Search
CPC ..... B23B 25/06; B23B 29/205; B23B 29/248; B23B 31/026; B23B 31/028; B23B 31/20; Y10T 82/2579; Y10T 279/14; Y10T 279/17538

See application file for complete search history.

(56) References Cited

U.S. PATENT DOCUMENTS

| | | | | |
|---|---|---|---|---|
| 2,442,444 A | * | 6/1948 | Tautz ................ | B23B 29/03414 279/6 |
| 2,833,544 A | * | 5/1958 | Blades .................... | B23B 31/36 279/16 |
| 4,218,068 A | * | 8/1980 | Lutz ...................... | B23B 31/026 279/133 |
| 5,048,384 A | * | 9/1991 | Carlen .................. | B23B 31/026 82/170 |
| 5,082,299 A | * | 1/1992 | Beattie .................... | B23B 31/36 228/49.1 |
| 5,533,847 A | * | 7/1996 | Basteck .................. | B23B 31/36 279/6 |
| 5,752,706 A | * | 5/1998 | Hodges ................. | B23B 31/026 279/16 |
| 5,772,219 A | * | 6/1998 | Vossen .................. | B23B 31/208 279/156 |

(Continued)

FOREIGN PATENT DOCUMENTS

DE 202015107160 U1 * 4/2016 ........... B23B 31/026

*Primary Examiner* — Eric A. Gates
(74) *Attorney, Agent, or Firm* — Lambert Shortell & Connaughton; Gary E. Lambert; David J. Connaughton, Jr.

(57) ABSTRACT

An adjustable collet holder for use with a lathe is provided. The adjustable collet holder may include a set of hold down screws to hold it in place once adjusted. Adjustment may be achieved by adjusting multiple set screws to change both angular and concentricity orientations of a collet receiver relative to a body of the collet holder.

18 Claims, 5 Drawing Sheets

(56) References Cited

U.S. PATENT DOCUMENTS

| | | | | |
|---|---|---|---|---|
| 6,186,712 | B1* | 2/2001 | Senzaki | B23B 31/026 |
| | | | | 279/125 |
| 6,557,445 | B1* | 5/2003 | Ishikawa | B23B 31/026 |
| | | | | 407/10 |
| 7,469,484 | B2* | 12/2008 | Marquart | B23B 31/36 |
| | | | | 279/133 |
| 8,720,311 | B2* | 5/2014 | Sheehy | B23B 29/205 |
| | | | | 29/35.5 |
| 9,138,811 | B2* | 9/2015 | Freilich | B23B 29/205 |
| 9,427,810 | B2* | 8/2016 | Park | B23Q 3/12 |
| 2006/0115337 | A1* | 6/2006 | Higashi | B23B 31/026 |
| | | | | 408/181 |
| 2014/0196583 | A1* | 7/2014 | Judas | B23B 29/205 |
| | | | | 82/121 |
| 2016/0016236 | A1* | 1/2016 | Evans | B23B 31/20 |
| | | | | 279/48 |
| 2016/0067788 | A1* | 3/2016 | Brown | B23B 31/20 |
| | | | | 279/43 |
| 2017/0189970 | A1* | 7/2017 | Chen | B23B 31/026 |

* cited by examiner

LATHE ERROR-CORRECTING COLLET CHUCK

BACKGROUND OF THE INVENTION

Field of the Invention

The present invention relates generally to a collet holder for a lathe. More particularly the present invention relates to a device that can allow adjustment of a collet and tooling orientation in three axes.

Description of Related Art

Lathes are widely used machines that allow formation of objects with symmetry about an axis. The lathe rotates a workpiece about an axis of rotation to perform varied operations such as cutting, sanding, drilling, facing, turning, knurling, and the like. Lathes operate by rotating a spindle having a workpiece attached. The workpiece is moved against a tool to perform the varied operations. The tool is generally held in place by a collet or similar chuck. As can be understood, the axis of rotation of the spindle and workpiece must be aligned precisely with the tool, and with the collet or chuck holding the tool in place. If not aligned, the workpiece and created object will be lopsided and imprecise.

The prior art seeks to align the spindle and tool-holding collet/chuck in many different ways. However, many of these suffer from limitations including imprecise alignment, ability to get thrown out of alignment during use, limitation on adjustability, and the like.

Therefore, what is needed is a device that may reliably and effectively adjust a positioning and alignment of a collet for holding a tool of a lathe.

SUMMARY OF THE INVENTION

The subject matter of this application may involve, in some cases, interrelated products, alternative solutions to a particular problem, and/or a plurality of different uses of a single system or article.

In one aspect, an adjustable collet holder for a lathe is provided. The collet holder has a body which is connectable to the lathe, and a collet receiver which is adjustably attached to the body. The collet receiver can be adjusted relative to the body about three axial directions, referred to as the x, y, and z directions to allow for both angular adjustments and concentricity adjustments with a spindle of the lathe. The directional adjustment may be done in various ways, as discussed throughout this disclosure. As such, the collet receiver can be very finely adjusted to align with a spindle of the lathe. The adjustable collet holder may employ a plurality of hold-down screws configured to secure a position of the collet receiver relative to the body when in a tightened position. These hold-down screws can be loosened when the collet receiver requires adjustment, and then tightened to maintain this adjusted position. In some embodiments, a plurality of angular set screws may be utilized for adjustment of an angular orientation of the collet receiver relative to the body, and a plurality of radial set screws may be utilized to allow for a radial adjustment of the collet receiver relative to the body. These angular and radial set screws may be used in embodiments having the hold-down screws, or embodiments without hold-down screws.

In another aspect, a lathe having an adjustable collet holder is provided. The lathe includes a spindle and the adjustable collet holder. The adjustable collet holder is aligned or alignable with the spindle as discussed in the various embodiments in this disclosure. In this aspect, the collet holder has a body connected to the lathe, and a collet receiver aligned with the spindle which is adjustable along the x, y, and z axes to allow for both angular adjustments and concentricity adjustments.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a lathe collet holder being adjustable in three dimensions along x, y, and z axes to control angular adjustments and lateral (concentricity) adjustments. Lateral adjustments (up-down, left-right) and angular adjustments are thus possible with the present collet holder. The device has a body, and a collet receiver which is adjustably attachable to the body. The collet receiver can be adjusted along the three noted axes with respect to the body to allow optimal concentric and angular alignment with a spindle of the lathe. The device may be used on any lathe type, including on a turret lathe, positioned on the lathe tail stock, or the like.

The body is configured to connect to the collet receiver, and has a shank which can be received by the lathe. In one embodiment, a plurality of hold down screws can release and hold the collet receiver to the body in loss and tight positions, respectively. In a further embodiment, in addition to the hold down screws, a plurality of protrusions or recessions of the collet receiver may interface with a plurality of protrusions or recessions of the body. The collet receiver, in one embodiment, may have a built in collet or other chuck. In another embodiment, the collet receiver may have the collet or other chuck removably connected.

In one embodiment, a plurality of angular and radial set screws may be positioned to adjust the relative connection of the collet receiver to the body. This embodiment may or may not include the hold down screws. In embodiments having them, the angular and radial set screws are different from the hold down screws. In many embodiments, an O-ring or other flexible spacer or gasket may be positioned between the collet receiver and body.

In some embodiments, a built in coolant flow-through system may be integrated into the device, allowing a coolant to flow through the system, for example through the body, into the collet receiver and/or collet, and to a tool held in the collet.

The term collet is used herein to refer not only to collets, but also to other chucks, and any clamps used to hold an object with approximate radial symmetry.

Figure 1:
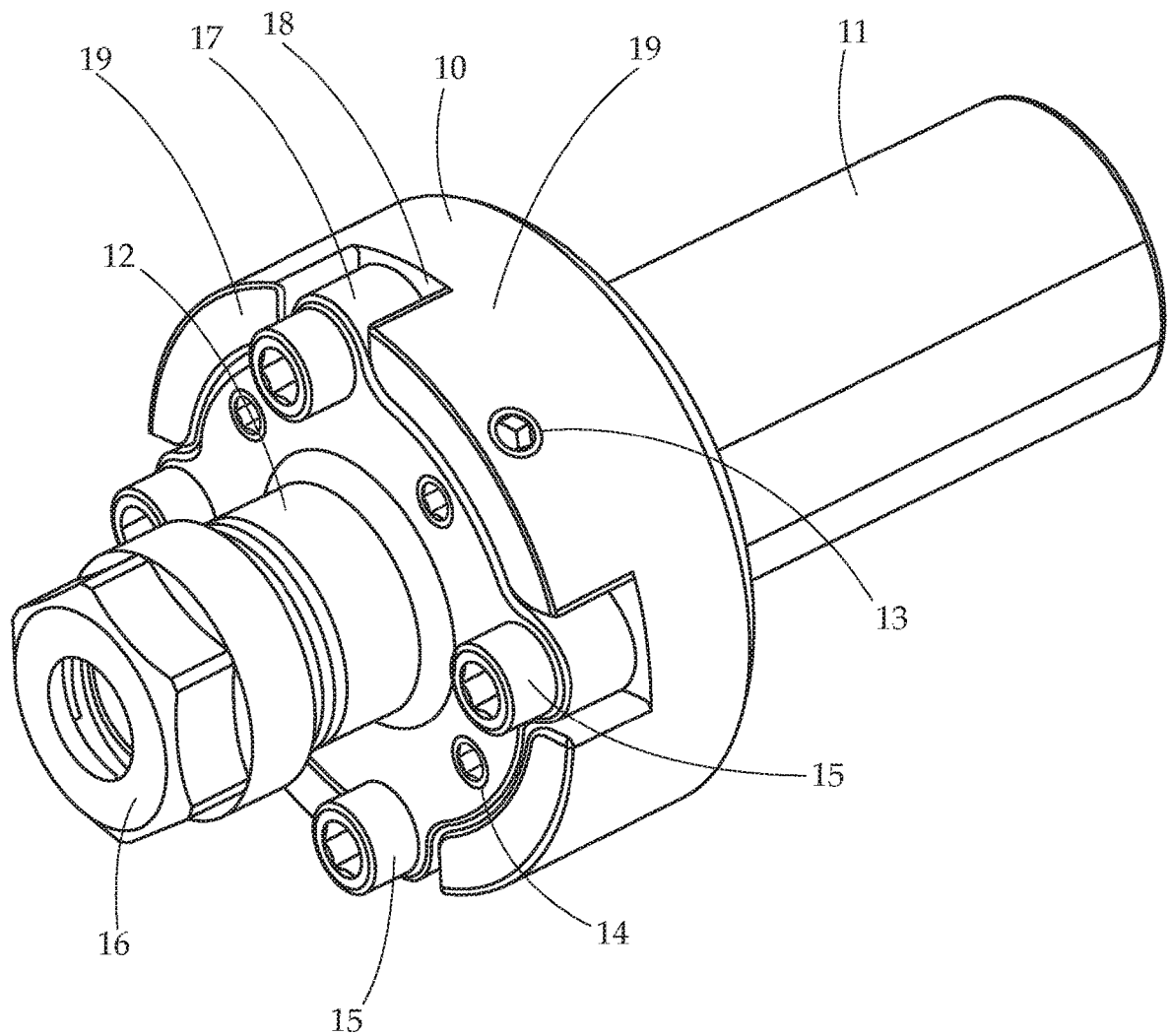
FIG. 1 provides a perspective view of an embodiment of the present invention.

Turning now to FIG. 1, a perspective view of an embodiment of the present invention is shown. In this view, the collet receiver 12 is connected to the body 10. Radial protrusions 17 of the collet receiver 12 are seated in radial slots 18 defined by body wall 19. In other embodiments, the radial protrusions may be part of the body 10 and the radial slots may be in the collet receiver 12. Four hold down screws 15 connect the collet receiver 12 to the body 10. Radial set screws 13 allow for a radial adjustment of the collet receiver 12 relative to body 10. These radial set screws 13 are positioned at different points along the body 10. Angular set screws 14 are positioned on the collet receiver 12 and can adjust angular orientation of the collet receiver 12 relative to the body 10. A collet nut 16 is used to hold a removable collet in position. Shank 11 is connected to/extended from a rear of the body 10 for insertion into the lathe turret, tail stock, and the like. The structure allows for adjustment in all directions, including lateral adjustments for concentricity (up-down, left-right) and also angular adjustments.

Figure 2:
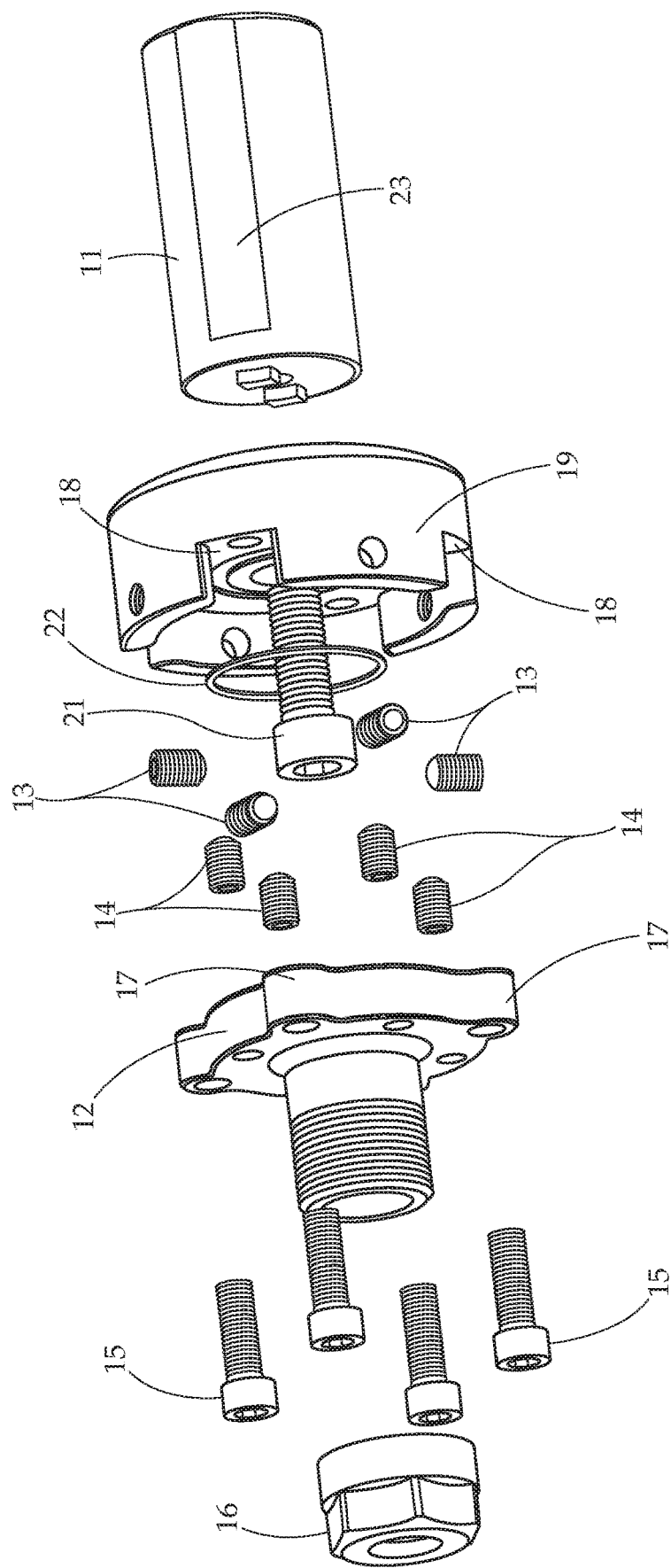
FIG. 2 provides an exploded view of an embodiment of the present invention.

FIG. 2 shows an exploded view of another embodiment of the present invention. Here, the connection of the four radial set screws 13, four angular set screws 14, and hold down screws 15 can be seen between the body 10 and collet receiver 12. The hold down screws 12 engage with threaded apertures of the body, while the set screws 13, 14 abut the faces of the collet receiver 12. While four screws are shown, it should be understood that other numbers of screws may be used without straying from the scope of this invention. An O-ring 22 can be seen positioned between the collet receiver 12 rear face and the front face of the body 10. The O-ring acts as a gasket and also provides a force between the body 10 and collet receiver 12 to aid in orienting one with respect to the other. Screw 21 connects the body to the shank 11, which has a flat face portion 23 which ensures proper alignment when being connected to the lathe.

Figure 3:
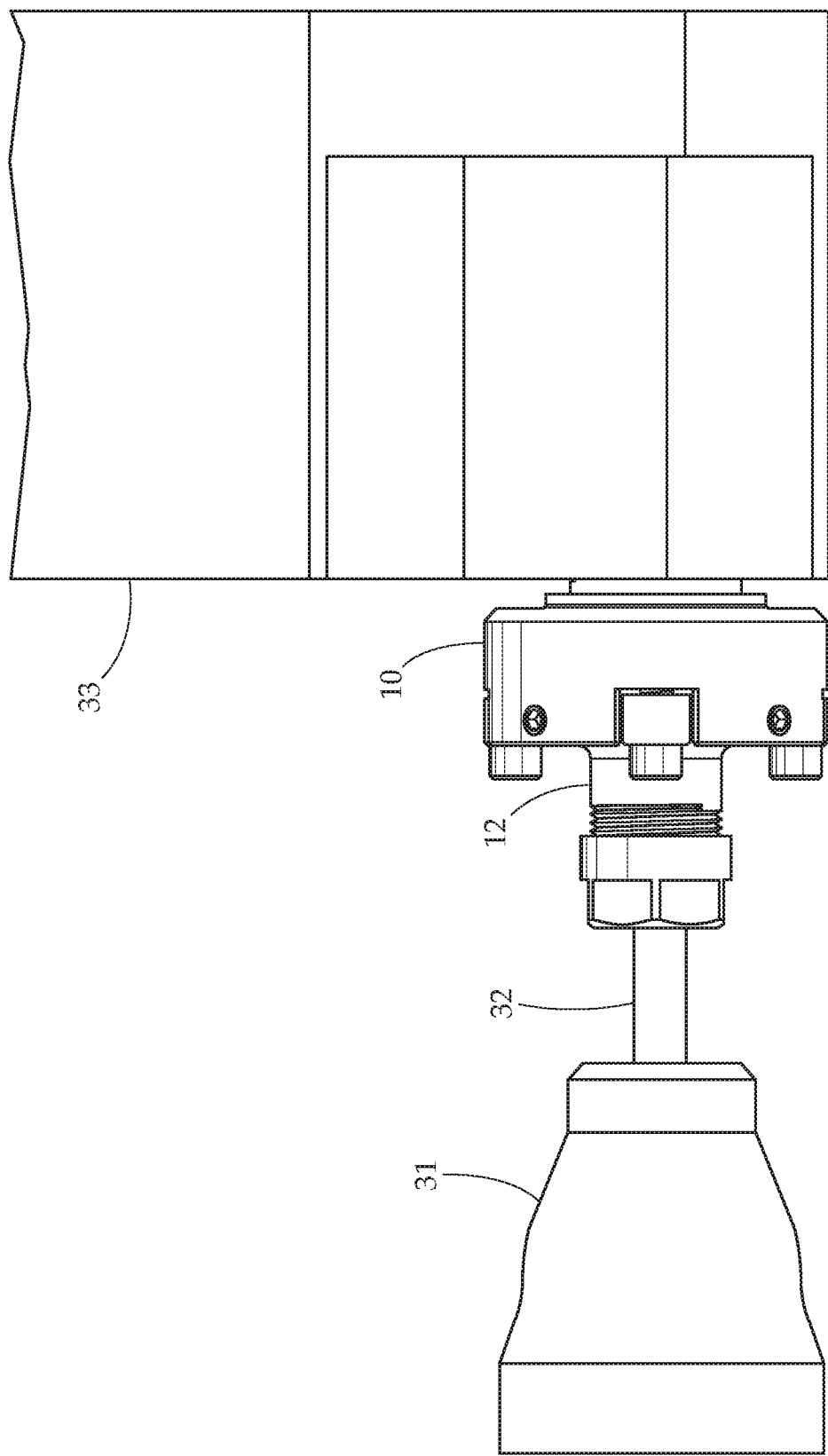
FIG. 3 provides a view of another embodiment of the present invention in a centering mode and attached to a lathe.

FIG. 3 shows and embodiment of the present invention attached to a lathe and in an adjustment mode. In this view, a rod 32 is attached to the spindle 31 of the lathe. The collet holder body 10 is connected to a turret 33 of the lathe. This attachment may be by any structure. As is known in the art, typically a chuck or collet holds the rod 32 to the spindle 31, but any other structure may be used without straying from the scope of this invention. A collet (not shown) is held by the collet receiver 12 and receives the rod 32. During adjustment to align the collet receiver 12 with the spindle 31, hold down screws 15 may be loosened, and the radial set screws 13 and angular set screws 14 may be adjusted for alignment purposes. Once aligned, the hold down screws 15 may be tightened to hold the collet receiver 12 in place. The rod 32 can be removed from both the collet (not shown) and spindle 31, and the lathe is aligned now ready for use.

In a particular embodiment of use, the collet holder may be mounted to the lathe, for example to a lathe turret. The angular set screws 14 and radial set screws 13 are backed out by an amount, for example ⅛". Hold down screws are loose such that the collet receiver 12 can move freely relative to the body 10, but not so far that components are excessively loosened. The rod, such as a ⅜" rod is clamped to the spindle, and then the rod is carefully jogged into a collet of the collet receiver. At this point the collet receiver 12 is movable in all directions. The collet is then clamped onto the rod, which will bring the collet receiver into true alignment with the spindle axis. At this point, the radial adjusting screws are lightly tightened until they bottom out, but not tightened further. The angular adjusting screws are then lightly tightened until bottoming out, but also not further. Excessive tightening will interfere with alignment. The hold down screws are then lightly tightened. All screws are then tightened to a predetermined and even torque. This predetermined torque may vary between hold down, angular set and radial set screws, or may be the same. At this point, the collet holder device is now ready for use. The spindle and rod are then unclamped, and a tool can be installed into the collet of the collet holder for use on the lathe.

Figure 4:
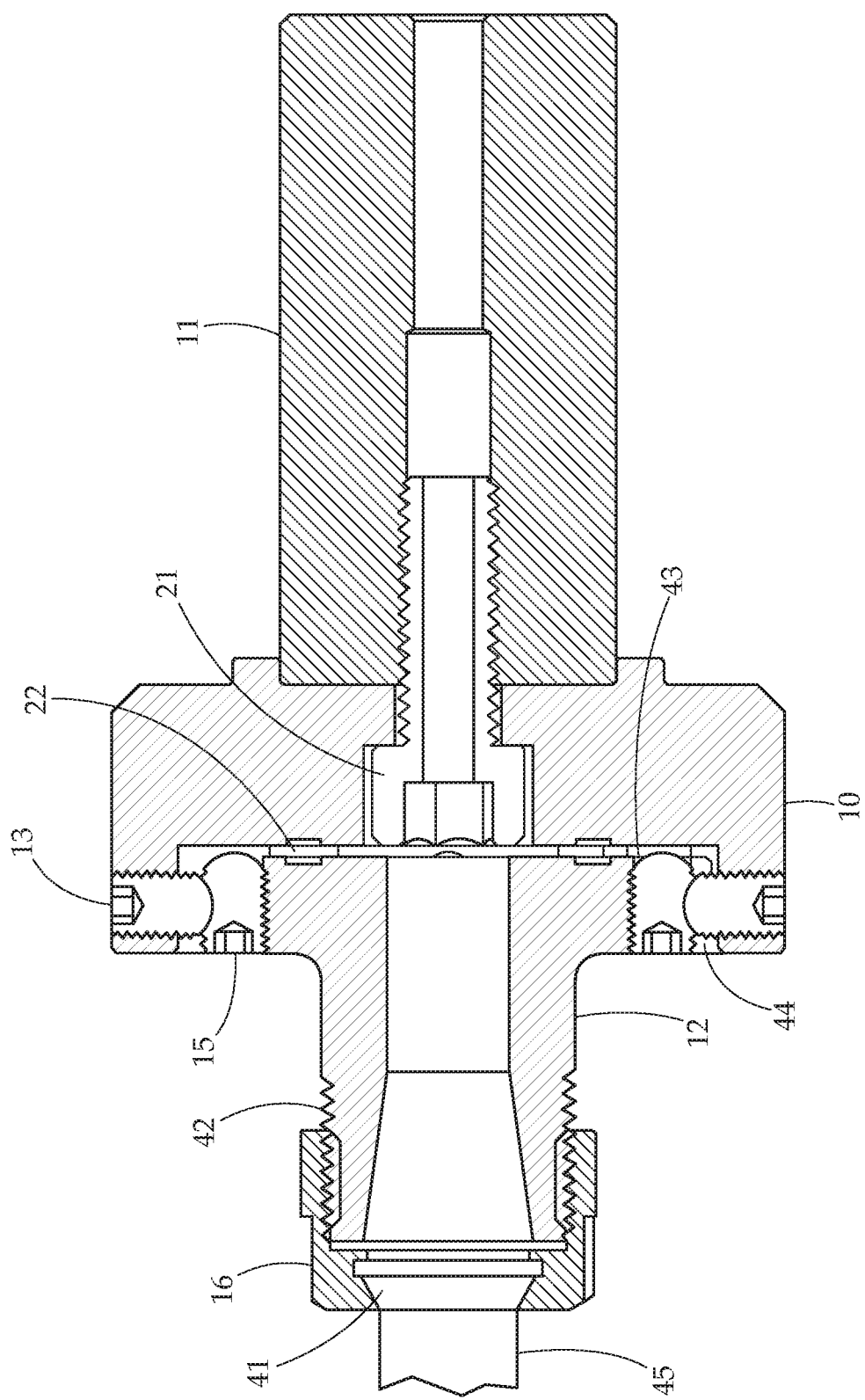
FIG. 4 provides a cross sectional view of yet another embodiment of the present invention.

FIG. 4 shows a cross sectional view of an embodiment of the present invention. In this view, the collet holder 12 can be seen held to the body 10. Set screws 13, 15, position the collet holder 12 relative to the body 10 and hold down screws (not shown in this view) engage with the body 10 to hold it in place. An O-ring 22 seats into recessions 51 and 52 in the body 10 and collet receiver 12, respectively. In this view, a collet 41 is positioned in the collet receiver 12 and held in place by the collet nut 16 and its threaded connection via threads 42. A tool 45 is secured by the collet 41 for use on the lathe. As can be seen, there are spacings at 44, and 43 which are a product of the adjustment of the collet receiver 12 and the positioning of the O-ring 22 which holds the collet receiver 12 off the inner face of the body 10.

Figure 5:
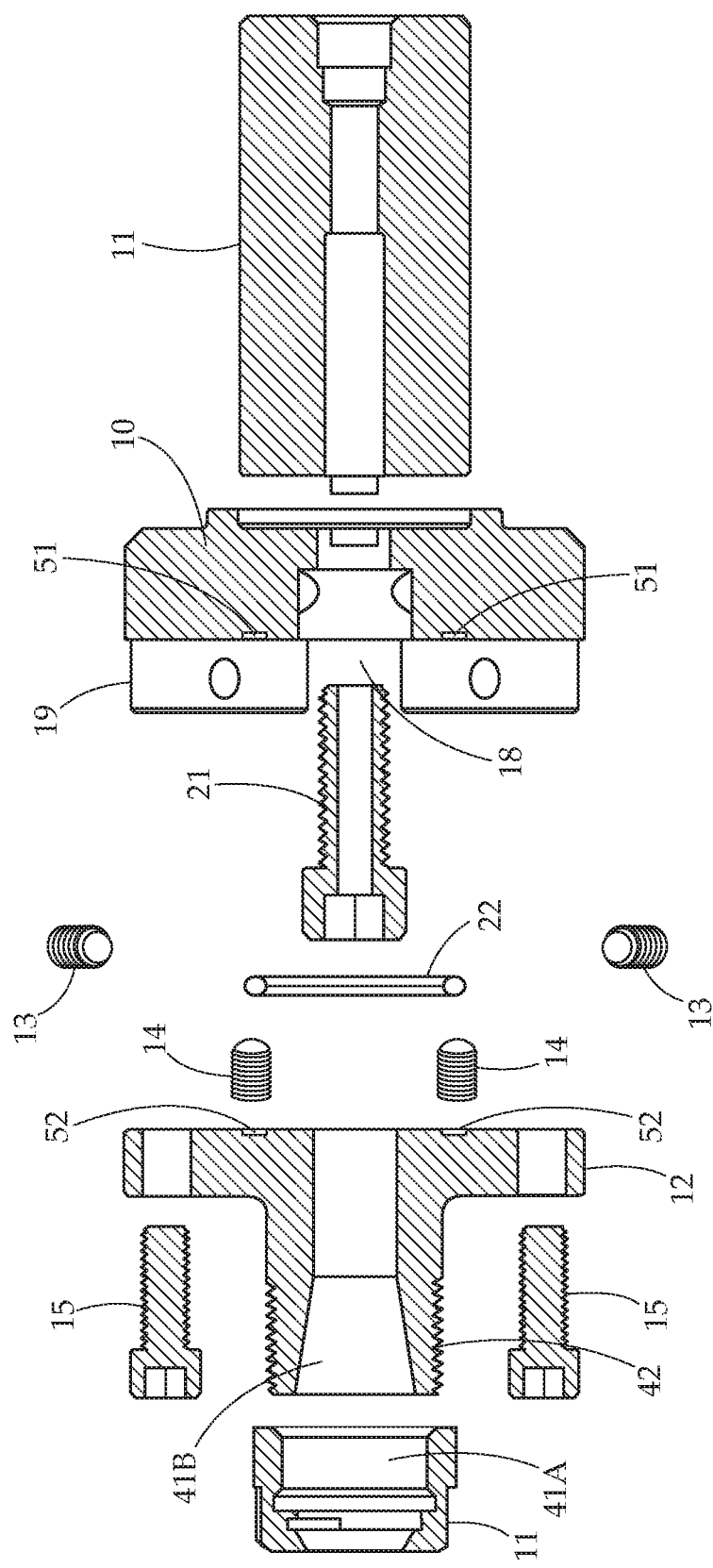
FIG. 5 provides a cross sectional exploded view of an embodiment of the present invention.

FIG. 5 provides an exploded and cross sectional view of an embodiment of the present invention. Here, the connection of the radial set screws 13, angular set screws 14, and hold down screws 15 can be seen between the body 10 and collet receiver 12. An O-ring 22 seats into recessions 51 and 52 in the body 10 and collet receiver 12, respectively. Screw 21 connects the body to the shank 11, which has a flat face portion 23 which ensures proper alignment when being connected to the lathe. In this embodiment, the collet receiver 12 features a built in collet, having elements 41B and 41A. Collet piece 41A is rotatable with respect to 41B to radially tighten a tool into place via threaded connection along threads 42.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. An adjustable collet holder for a lathe comprising:
   a body connectable to the lathe;
   a collet receiver, the collet receiver adjustably attached to the body allowing for both lateral and angular adjustments to align a collet of the collet receiver with a spindle of the lathe; and
   wherein the body defines a sidewall, a plurality of radial protrusions on at least one of the collet receiver and the sidewall engaged with a plurality of radial slots of the other of the collet receiver and the sidewall.

2. The adjustable collet holder of claim 1 further comprising a plurality of hold-down screws configured to secure a position of the collet receiver relative to the body when in a tightened position.

3. The adjustable collet holder of claim 2 further comprising a plurality of angular set screws for adjustment of an angular orientation of the collet receiver relative to the body, and a plurality of radial set screws to allow for a radial adjustment of the collet receiver relative to the body.

4. The adjustable collet holder of claim 1 further comprising a plurality of angular set screws for adjustment of an angular orientation of the collet receiver relative to the body, and a plurality of radial set screws to allow for a radial adjustment of the collet receiver relative to the body.

5. The adjustable collet holder of claim 1 further comprising a collet built into the collet receiver.

6. The adjustable collet holder of claim 1 further comprising a collet removably connected to the collet receiver.

7. The adjustable collet holder of claim 1 further comprising a flexible gasket positioned between the collet receiver and the body.

8. The adjustable collet holder of claim 1 further comprising a built in coolant flow through allowing fluid to flow through the body to a collet of the collet receiver.

9. The adjustable collet holder of claim 1 comprising a collet positioned in the collet receiver, a tool held in place by the collet.

10. The adjustable collet holder of claim 1 wherein the body further comprises a shank extending from a rear of the body, the shank configured to be connected to a lathe.

11. A lathe having an adjustable collet holder comprising:
a spindle;
the adjustable collet holder aligned with the spindle and comprising:
a body connected to the lathe;
a collet receiver, the collet receiver adjustably attached to the body allowing for both lateral and angular adjustments to align a collet of the collet receiver with a spindle of the lathe; and
wherein the body of the collet holder defines a sidewall, a plurality of protrusion on at least one of the collet receiver and the sidewall engaged with a plurality of slots of the other of the collet receiver and the sidewall.

12. The lathe of claim 11 wherein the collet holder comprises a plurality of hold-down screws configured to secure a position of the collet receiver relative to the body when in a tightened position.

13. The lathe of claim 12 wherein the collet holder further comprises a plurality of angular set screws for adjustment of an angular orientation of the collet receiver relative to the body, and a plurality of radial set screws to allow for a radial adjustment of the collet receiver relative to the body.

14. The lathe of claim 11 wherein the collet holder further comprising a flexible gasket positioned between the collet receiver and the body.

15. The lathe of claim 11 wherein the collet holder is connected to a turret of the lathe.

16. The lathe of claim 11 wherein the collet receiver further comprises a built in coolant flow through allowing fluid to flow through the body to a collet of the collet receiver.

17. The lathe of claim 11 wherein the collet receiver further comprises a shank extending from a rear of the body, the shank configured to be connected to a lathe.

18. The lathe of claim 11 wherein the collet receiver comprises a collet positioned in the collet receiver, a tool held in place by the collet, the tool aligned with the spindle.

* * * * *